United States Patent
Liu et al.

(10) Patent No.: US 12,214,422 B2
(45) Date of Patent: Feb. 4, 2025

(54) METHOD FOR PREVENTING CRACKING OF NICKEL-BASED SUPERALLOY FABRICATED BY SELECTIVE LASER MELTING

(71) Applicant: CENTRAL SOUTH UNIVERSITY, Changsha (CN)

(72) Inventors: Zuming Liu, Changsha (CN); Bizhong Nong, Changsha (CN); Bing Wei, Changsha (CN); Yake Ren, Changsha (CN); Xu Zhou, Changsha (CN); Sizhe Lu, Changsha (CN); Bin Cao, Changsha (CN); Yongkang Ai, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 652 days.

(21) Appl. No.: 17/490,355

(22) Filed: Sep. 30, 2021

(65) Prior Publication Data

US 2022/0062995 A1 Mar. 3, 2022

Related U.S. Application Data

(63) Continuation of application No. PCT/CN2021/109546, filed on Jul. 30, 2021.

(30) Foreign Application Priority Data

Aug. 30, 2020 (CN) .......................... 202010891107.5

(51) Int. Cl.
| | |
|---|---|
| *B22F 10/28* | (2021.01) |
| *B22F 10/368* | (2021.01) |
| *B23K 26/32* | (2014.01) |
| *B23K 26/342* | (2014.01) |
| *B33Y 10/00* | (2015.01) |
| *B33Y 70/00* | (2020.01) |
| *C22C 19/05* | (2006.01) |

(52) U.S. Cl.
CPC ............ *B22F 10/28* (2021.01); *B22F 10/368* (2021.01); *B23K 26/32* (2013.01); *B23K 26/342* (2015.10); *B33Y 10/00* (2014.12); *B33Y 70/00* (2014.12); *C22C 19/056* (2013.01); *B22F 2201/11* (2013.01); *B22F 2301/15* (2013.01)

(58) Field of Classification Search
CPC ........ B22F 10/28; B22F 10/36; B22F 10/366; B22F 10/368; B22F 2009/0824; B22F 2009/0844; B22F 2201/11; B22F 2301/15; B22F 2999/00; B22F 9/082; B23K 26/0006; B23K 26/32; B23K 26/342; B33Y 10/00; B33Y 50/02; B33Y 70/00; C22C 1/0433; C22C 19/056; Y02P 10/25

See application file for complete search history.

(56) References Cited

U.S. PATENT DOCUMENTS

| | | | | |
|---|---|---|---|---|
| 10,486,233 | B2* | 11/2019 | Liu .................... | B02C 25/00 |
| 2013/0228302 | A1* | 9/2013 | Rickenbacher ........ | B33Y 40/10 164/492 |
| 2016/0348216 | A1* | 12/2016 | Szuromi .................. | F01D 5/28 |

FOREIGN PATENT DOCUMENTS

| | | |
|---|---|---|
| CN | 106623959 A | 5/2017 |
| CN | 109439962 A | 3/2019 |
| CN | 111500898 A | 8/2020 |

OTHER PUBLICATIONS

Wang Li, et al., Research on Selective Laser Melting Process of Inconel 625 Alloy, The 14th National Academic Conference on Special Processing, 2011.
Neil J. Harrison, et al., Reduction of micro-cracking in nickel superalloys processed by Selective Laser Melting: A fundamental alloy design approach, Acta Materialia, 2015, pp. 59-68, 94.

* cited by examiner

*Primary Examiner* — Joe E Mills, Jr.
(74) *Attorney, Agent, or Firm* — Bayramoglu Law Offices LLC

(57) ABSTRACT

A method for preventing cracking of nickel-based superalloy fabricated by selective laser melting (SLM) belongs to the field of additive manufacturing (AM). The method of preparing an as-built part with a high density, no crack defects, and good mechanical properties includes: reducing the content of elements Zr and B forming low melting point phase in a nickel-based superalloy, adjusting the total content of Al and Ti in the alloy to 4.5 wt % or below, and combining with the control of special SLM process parameters. The new method has the advantages of a reasonable component design, a simple preparation process, and good performance of the as-built part, and therefore is suitable for large-scale application.

7 Claims, No Drawings

METHOD FOR PREVENTING CRACKING OF NICKEL-BASED SUPERALLOY FABRICATED BY SELECTIVE LASER MELTING

CROSS REFERENCE TO THE RELATED APPLICATIONS

This application is the continuation application of International Application No. PCT/CN2021/109546, filed on Jul. 30, 2021, which is based upon and claims priority to Chinese Patent Applications No. 202010891107.5, filed on Aug.30, 2020, the entire contents of which are incorporated herein by reference.

TECHNICAL FIELD

The present disclosure provides a method for preventing cracking of nickel-based superalloy fabricated by selective laser melting (SLM), and belongs to the field of additive manufacturing (AM).

BACKGROUND

Nickel-based superalloys have high strength and good oxidation resistance, fatigue resistance, and wear resistance at high temperature, have been widely applied in the fields such as structure parts of turbine discs of rocket engines and aero engines. As the thrust to weight ratio of aero engines is constantly increasing, the integrated design of engine components poses a serious challenge to conventional forming methods. The SLM technology directly melts metal powder layer by using high-energy laser beam based on three-dimensional computer-aided design data, and build a near-net shaped three-dimensional part through stacking layer by layer. It has unique advantages for the preparation of difficult machining materials and the integrated building of components with complex structures.

However, the rapid cooling rate, repeated remelting and large thermal gradient in the SLM process could lead to a large residual stress in the as-built part, making the as-built part prone to deformation, warping, and cracking. Cracking is more likely to occur especially in as-SLMed parts of nickel-based superalloys with complex alloy composition.

In view of the cracking problem in SLM-built nickel-based superalloys, Wang et al. [Wang Li et al., The 14th National Academic Conference on Special Processing, 2011, 502-507] reported that optimizing SLM process parameters of a solid solution strengthened nickel-based superalloy Inconel 625, such as laser power, scanning speed, scanning space, and scanning layer thickness, can improve the density and mechanical properties of the as-built part, but fails to completely eliminate cracks. Harrison et al. [Harrison N J, et al., Acta Materialia, 2015, 94: 59-68] prepared a precipitation strengthened nickel-based superalloy Hastelloy X by SLM. By adding solid solution alloying elements, the high-temperature tensile strength of the alloy was improved, and cracks in the as-built alloy samples were reduced by 65%.

In most of the present processes, the cracking of the SLM-built part is suppressed by optimizing SLM process parameters or by adding trace elements and solid solution elements. The present disclosure proposes a method of preventing cracking of 3D printed part by reducing the content of some alloy elements and controlling 3D printing process parameters. Up to now, this method has not been reported yet.

SUMMARY

In view of the foregoing problems, the present disclosure provides a method for preventing cracking of nickel-based superalloy fabricated by SLM. In the present disclosure, the SLM-built nickel-based superalloy is effectively prevented from cracking by controlling the content of elements forming a low melting point phase in the nickel-based superalloy and controlling special SLM process parameters, thereby obtaining an as-built part with a high density, no crack defects, and good mechanical properties. The present disclosure proposes, for the first time, a method of preparing an as-built part with a high density, no crack defects, and good mechanical properties by reducing the content of elements Zr and B forming low melting point phase in nickel-based superalloy, adjusting the total content of (Ti+Al) in the alloy to 4.5 wt % or below, and controlling special SLM process parameters.

The present disclosure provides a method for preventing cracking of nickel-based superalloy fabricated by SLM, including the following steps:

step 1: adjustment of alloy composition:
reducing the content of Zr and B in a nickel-based superalloy, and adjusting the total content of Al and Ti in the nickel-based superalloy to 4.5 wt % or below, to obtain a required nickel-based superalloy powder; and step 2: SLM building:
preparing an as-built nickel-based superalloy part in protective atmosphere by SLM building process using the required nickel-based superalloy powder as a raw material.

In the present disclosure, in the step 1, the content of Zr in the nickel-based superalloy powder is 0%. During technology development, it was found that Zr caused the expansion of an alloy solidification temperature range, resulting in the formation of low melting point phases such as $Ni_xZr_y$, which can greatly increase the probability of cracks in the as-built part during 3D printing.

In the present disclosure, in the step 1, the content of B in the nickel-based superalloy powder is 0-0.02 wt %. During technology development, it was found that B was easy to enrich on the grain boundary, and when B continued to enrich to the critical point, low melting point phases such as $M_3B_2$ will be formed. These low melting point phases greatly increase the probability of cracks in the as-built part during 3D printing. In addition, during technology development, it was also found that when the content of B is less than 0.02%, the probability of cracks in the as-built part is greatly reduced during 3D printing.

During technology development, it was found that when the total content of (Ti+Al) in the nickel-based superalloy is 4.5 wt % or below, its weldability is good, and the as-built part has a high density.

In the present disclosure, in the SLM-building process, a substrate heating temperature is controlled to 150° C., a rotation angle between scanning layers is controlled to 67.5°, a laser input power is controlled to 300-350 W, preferably 315-335 W, a scanning speed is controlled to 750-850 mm/s, preferably 785-815 mm/s, a scanning space is controlled to 0.11-0.13 mm, and a powder layer thickness is controlled to 30-40 μm. During technology development, it was found that the density of the as-built part is high when the laser power is 300-350 W. An extremely low laser power leads to a high porosity of the as-built part due to incompletely melting of the alloy powder. An extremely high laser power leads to severe cracking due to greater thermal stress in the as-built part.

In the present disclosure, in the SLM-building process, a laser spot diameter is controlled to 0.12 mm.

In the present disclosure, in the SLM-building process, a snake scanning strategy is used for laser scanning.

In step 2, the nickel-based superalloy powder is prepared by argon atomization or by plasma rotating electrode process (PREP).

In step 2, the protective atmosphere is an argon atmosphere.

As a preferred solution, a method for preventing cracking of nickel-based superalloy fabricated by SLM, where the nickel-based superalloy powder includes the following components in percentage by mass:

Co: 20.6 wt %;
Cr: 13.0 wt %;
Mo: 3.8 wt %;
W: 2.1 wt %;
Al: 2.0 wt %;
Ti: 2.5 wt %;
Ta: 2.4 wt %;
Nb: 0.9 wt %;
Zr: 0 wt %;
B: 0.01 wt %;
C: 0.04 wt %; and
Ni: the balance;

preparing the nickel-based superalloy powder by argon atomization, and sieving to obtain the powder suitable for SLM building; and using SLM building, adjusting a substrate heating temperature to 150° C., setting a rotation angle between scanning layers to 67°, setting a laser input power to 325 W, setting a scanning speed to 800 mm/s, setting a scanning space to 0.12 mm, setting a powder layer thickness to 30 μm, selecting a laser spot diameter of 0.12 mm, using a snake scanning strategy for laser scanning. After argon gas is introduced, printing is started to obtain an as-built part with a density of 99.35%, and no cracks and a tensile strength of 1145 MPa at room temperature on X-Y plane.

As a preferred solution, the nickel-based superalloy powder includes the following components in percentage by mass:

Co: 8.5 wt %;
Cr: 16 wt %;
Mo: 1.75 wt %;
W: 2.6 wt %;
Al: 2.0 wt %;
Ti: 2.5 wt %;
Ta: 1.75 wt %;
Nb: 0.9 wt %;
Zr: 0 wt %;
B: 0 wt %;
C: 0.11 wt %; and
Ni: the balance;

preparing the nickel-based superalloy powder by argon atomization, and sieving to obtain the powder suitable for SLM building; and The SLM building is used, a substrate heating temperature is adjusted to 150° C., a rotation angle between scanning layers is set to 67°, a laser input power is set to 300 W, a scanning speed is set to 750 mm/s, a scanning space is set to 0.12 mm, a powder layer thickness is set to 30 a laser spot diameter of 0.12 mm is selected, a snake scanning strategy is used for laser scanning. After argon gas is introduced, printing is started to obtain an as-built part with a density of 99.28%, and no cracks and a tensile strength of 1127 MPa at room temperature on X-Y plane.

The advantages and beneficial effects of the present disclosure are as follows:

(1) The present disclosure proposes, for the first time, a method of preparing an as-built part with a high density, no crack defects, and good mechanical properties by reducing the content of elements Zr and B forming low melting point phase in a nickel-based superalloy, adjusting the total content of Al and Ti in the alloy to 4.5 wt % or below, and combining with the control of special SLM process parameters.

(2) In the optimized solution of the present disclosure, to solve the problem of cracking of a precipitation strengthened nickel-based superalloy (such as Rene 104 or Inconel 738LC) during 3D printing, a "subtraction" measure is adopted, that is, reducing the content of elements Zr and B forming low melting point phase in a nickel-based superalloy and adjusting the total content of Al and Ti in the alloy to 4.5 wt % or below, which greatly reduces the cracking sensitivity of the alloy. This method is simple to operate, has significant effects, and is suitable for large-scale application.

(3) The present disclosure reduces the thermal gradient in the SLM building process of the nickel-based superalloy by preheating the substrate. In addition, according to physical characteristics (including composition, laser absorption and reflection efficiency, powder flowability, etc.) of the raw material powder, the present disclosure optimizes process parameters such as laser power, scanning speed, formation layer thickness, and scanning space, thereby minimizes the thermal stress of the as-built part. This provides necessary conditions for the preparation of an as-built nickel-based superalloy part with a high density, good quality, no crack defects, and good mechanical properties.

DETAILED DESCRIPTION OF THE EMBODIMENTS

Example 1

(1) A precipitation strengthened Rene 104 nickel-based superalloy included the following components in percentage by mass:

Co: 20.6 wt %;
Cr: 13.0 wt %;
Mo: 3.8 wt %;
W: 2.1 wt %;
Al: 3.4 wt %;
Ti: 3.9 wt %;
Ta: 2.4 wt %;
Nb: 0.9 wt %;
Zr: 0.05 wt %;
B: 0.03 wt %;
C: 0.04 wt %; and
Ni: the balance.

The contents of Zr, B, Al, and Ti in the Rene 104 nickel-based superalloy were adjusted to obtain the alloy composition including the following components in percentage by mass:

Co: 20.6 wt %;
Cr: 13.0 wt %;
Mo: 3.8 wt %;
W: 2.1 wt %;
Al: 2.0 wt %;
Ti: 2.5 wt %;
Ta: 2.4 wt %;
Nb: 0.9 wt %;

Zr: 0 wt %;
B: 0.01 wt %;
C: 0.04 wt %; and
Ni: the balance.

The nickel-based superalloy powder was prepared by argon atomization, and was sieved to obtain the powder suitable for SLM building (where the particle size of the nickel-based superalloy powder suitable for SLM building is 15-53 μm).

(2) The SLM building was used, a substrate heating temperature was adjusted to 150° C., a rotation angle between scanning layers was set to 67°, a laser input power was set to 325 W, a scanning speed was set to 800 mm/s, a scanning space was set to 0.12 mm, a powder layer thickness was set to 30 μm, a laser spot diameter of 0.12 mm was selected, a snake scanning strategy was selected for laser scanning. After argon gas was introduced, printing was started, the as-built part was a cubic block with a size of 10×10×10 mm. After the printing was completed, the as-built part was separated from the substrate.

The as-built part obtained by the foregoing steps has a density of 99.35% and no cracks, and has a tensile strength of 1145 MPa at room temperature on an X-Y plane.

Comparative Example 1

(1) A René 104 nickel-based superalloy powder was prepared by argon atomization, and was sieved to obtain the powder suitable for SLM building (where the particle size of the nickel-based superalloy powder suitable for SLM building is 15-53 μm).

(2) The SLM building was used, a substrate heating temperature was adjusted to 150° C., a rotation angle between scanning layers was set to 67°, a laser input power was set to 350 W, a scanning speed was set to 800 mm/s, a scanning space was set to 0.12 mm, a powder layer thickness was set to 30 μm, a laser spot diameter of 0.12 mm was selected, a snake scanning strategy was selected for laser scanning. After argon gas was introduced, printing was started, and the as-built part was a cubic block with a size of 10×10×10 mm. After the printing was completed, the as-built part was separated from the substrate.

The as-built part obtained by the foregoing steps has a density of 97.35% and a large quantity of micro-cracks, and has a tensile strength of 834 MPa at room temperature on an X-Y plane.

Comparative Example 2

(1) The contents of B and Zr in the Rene 104 nickel-based superalloy were adjusted to obtain the alloy composition including the following components in percentage by mass:
Co: 20.6 wt %;
Cr: 13.0 wt %;
Mo: 3.8 wt %;
W: 2.1 wt %;
Al: 3.4 wt %;
Ti: 3.9 wt %;
Ta: 2.4 wt %;
Nb: 0.9 wt %;
Zr: 0 wt %;
B: 0.01 wt %;
C: 0.04 wt %; and
Ni: the balance.

The nickel-based superalloy powder was prepared by argon atomization, and was sieved to obtain the powder suitable for SLM building (where the particle size of the nickel-based superalloy powder suitable for SLM building is 15-53 μm).

(2) The SLM building was used, a substrate heating temperature was adjusted to 150° C., a rotation angle between scanning layers was set to 67°, a laser input power was set to 325 W, a scanning speed is set to 800 mm/s, a scanning space was set to 0.12 mm, a powder layer thickness was set to 30 μm, a laser spot diameter of 0.12 mm was selected, a snake scanning strategy was selected for laser scanning. After argon gas was introduced, printing was started, and the as-built part was a cubic block with a size of 10×10×10 mm. After the printing was completed, the as-built part was separated from the substrate.

The as-built part obtained by the foregoing steps has a density of 98.65% and a small quantity of micro-cracks, and has a tensile strength of 915 MPa at room temperature on an X-Y plane.

Comparative Example 3

(1) The contents of Al and Ti in the Rene 104 nickel-based superalloy were adjusted to obtain the alloy composition including the following components in percentage by mass:
Co: 20.6 wt %;
Cr: 13.0 wt %;
Mo: 3.8 wt %;
W: 2.1 wt %;
Al: 2.0 wt %;
Ti: 2.5 wt %;
Ta: 2.4 wt %;
Nb: 0.9 wt %;
Zr: 0.05 wt %;
B: 0.03 wt %;
C: 0.04 wt %; and
Ni: the balance.

The nickel-based superalloy powder was prepared by argon atomization, and was sieved to obtain the powder suitable for SLM building (where the particle size of the nickel-based superalloy powder suitable for SLM building is 15-53 μm).

(2) The SLM building was used, a substrate heating temperature was adjusted to 150° C., a rotation angle between scanning layers was set to 67°, a laser input power was set to 325 W, a scanning speed was set to 800 mm/s, a scanning space was set to 0.12 mm, a powder layer thickness was set to 30 μm, a laser spot diameter of 0.12 mm was selected, a snake scanning strategy was selected for laser scanning. After argon gas was introduced, printing was started, and the as-built part was a cubic block with a size of 10×10×10 mm. After the printing was completed, the as-built part was separated from the substrate.

The as-built part obtained by the foregoing steps has a density of 98.85% and a small quantity of micro-cracks, and has a tensile strength of 986 MPa at room temperature on an X-Y plane.

Example 2

(1) A precipitation strengthened Inconel 738LC nickel-based superalloy included the following components in percentage by mass:
Co: 8.5 wt %;
Cr: 16 wt %;
Mo: 1.75 wt %;
W: 2.6 wt %;
Al: 3.4 wt %;

Ti: 3.4 wt %;
Ta: 1.75 wt %;
Nb: 0.9 wt %;
Zr: 0.06 wt %;
B: 0.01 wt %;
C: 0.11 wt %; and
Ni: the balance.

The contents of Zr, B, Al, and Ti in the Inconel 738LC nickel-based superalloy were adjusted to obtain the alloy composition including the following components in percentage by mass:
Co: 8.5 wt %;
Cr: 16 wt %;
Mo: 1.75 wt %;
W: 2.6 wt %;
Al: 2.0 wt %;
Ti: 2.5 wt %;
Ta: 1.75 wt %;
Nb: 0.9 wt %;
Zr: 0 wt %;
B: 0.01 wt %;
C: 0.11 wt %; and
Ni: the balance.

The nickel-based superalloy powder was prepared by argon atomization, and was sieved to obtain the powder suitable for SLM building (where the particle size of the nickel-based superalloy powder suitable for SLM building is 15-53 μm).

(2) The SLM building was used, a substrate heating temperature was adjusted to 150° C., a rotation angle between scanning layers was set to 67°, a laser input power was set to 300 W, a scanning speed was set to 750 mm/s, a scanning space was set to 0.12 mm, a powder layer thickness was set to 30 μm, a laser spot diameter of 0.12 mm was selected, a snake scanning strategy was selected for laser scanning. After argon gas was introduced, printing was started, and the as-built part was a cubic block with a size of 10×10×10 mm. After the printing was completed, the as-built part was separated from the substrate.

The as-built part obtained by the foregoing steps has a density of 99.28% and no cracks, and has a tensile strength of 1127 MPa at room temperature on an X-Y plane.

Comparative Example 4

(1) The Inconel 738LC nickel-based superalloy powder was prepared by argon atomization, and was sieved to obtain the powder suitable for SLM building (where the particle size of the nickel-based superalloy powder suitable for SLM building is 15-53 μm).

(2) The SLM building was used, a substrate heating temperature was adjusted to 150° C., a rotation angle between scanning layers was set to 67°, a laser input power was set to 300 W, a scanning speed was set to 750 mm/s, a scanning space was set to 0.12 mm, a powder layer thickness was set to 30 μm, a laser spot diameter of 0.12 mm was selected, a snake scanning strategy was selected for laser scanning. After argon gas was introduced, printing was started, and the as-built part was a cubic block with a size of 10×10×10 mm. After the printing was completed, the as-built part was separated from the substrate.

The as-built part obtained by the foregoing steps has a density of 97.56% and a large quantity of micro-cracks, and has a tensile strength of 864 MPa at room temperature on an X-Y plane.

Comparative Example 5

(1) The contents of B and Zr in the Inconel 738LC nickel-based superalloy were adjusted to obtain the alloy composition including the following components in percentage by mass:
Co: 8.5 wt %;
Cr: 16 wt %;
Mo: 1.75 wt %;
W: 2.6 wt %;
Al: 3.4 wt %;
Ti: 3.4 wt %;
Ta: 1.75 wt %;
Nb: 0.9 wt %;
Zr: 0 wt %;
B: 0.01 wt %;
C: 0.11 wt %; and
Ni: the balance.

The nickel-based superalloy powder was prepared by argon atomization, and was sieved to obtain the powder suitable for SLM building (where the particle size of the nickel-based superalloy powder suitable for SLM building is 15-53 μm).

(2) The SLM building was used, a substrate heating temperature was adjusted to 150° C., a rotation angle between scanning layers was set to 67°, a laser input power was set to 300 W, a scanning speed was set to 750 mm/s, a scanning space was set to 0.12 mm, a powder layer thickness was set to 30 μm, a laser spot diameter of 0.12 mm was selected, a snake scanning strategy was selected for laser scanning. After argon gas was introduced, printing was started, and the as-built part was a cubic block with a size of 10×10×10 mm. After the printing was completed, the as-built part was separated from the substrate.

The as-built part obtained by the foregoing steps has a density of 98.25% and a small quantity of micro-cracks, and has a tensile strength of 895 MPa at room temperature on an X-Y plane.

Comparative Example 6

(1) The contents of Al and Ti in the Inconel 738LC nickel-based superalloy were adjusted to obtain the alloy composition including the following components in percentage by mass:
Co: 8.5 wt %;
Cr: 16 wt %;
Mo: 1.75 wt %;
W: 2.6 wt %;
Al: 2.0 wt %;
Ti: 2.5 wt %;
Ta: 1.75 wt %;
Nb: 0.9 wt %;
Zr: 0.06 wt %;
B: 0.01 wt %;
C: 0.11 wt %; and
Ni: the balance.

The nickel-based superalloy powder was prepared by argon atomization, and was sieved to obtain the powder suitable for SLM building (where the particle size of the nickel-based superalloy powder suitable for SLM building is 15-53 μm).

(2) The SLM building was used, a substrate heating temperature was adjusted to 150° C., a rotation angle between scanning layers was set to 67°, a laser input power was set to 300 W, a scanning speed was set to 750 mm/s, a scanning space was set to 0.12 mm, a powder layer thickness was set to 30 μm, a laser spot diameter of 0.12 mm was selected, a snake scanning strategy was selected for laser scanning. After argon gas was introduced, printing was started, and the as-built part was a cubic block with a size of 10×10×10 mm. After the printing was completed, the as-built part was separated from the substrate.

The as-built part obtained by the foregoing steps has a density of 98.78% and a small quantity of micro-cracks, and has a tensile strength of 915 MPa at room temperature on an X-Y plane.

It can be seen from the examples and the comparative examples that the present disclosure can obtain a product with excellent performance only through the collaboration of various condition parameters and processes. When one or more of the implementation steps or the implementation condition parameters go beyond the protection scope claimed by the present disclosure, the performance of the product is much lower than that of the present disclosure.

What is claimed is:

1. A method for preventing cracking of a nickel-based superalloy fabricated by selective laser melting (SLM), comprising:
   step 1: adjustment of alloy composition:
   reducing a content of Zr to 0 wt % and a content of B to 0-0.02 wt % in the nickel-based superalloy, and adjusting a content of Al to 4.5 wt % or below and a content of Ti to 4.5 wt % or below in the nickel-based superalloy, to obtain a required nickel-based superalloy powder; and
   step 2: SLM building:
   preparing an as-built part under a protective atmosphere by an SLM building process using the required nickel-based superalloy powder as a raw material.

2. The method according to claim 1, wherein
   in the SLM building process, a substrate heating temperature is controlled to 150° C., a rotation angle between scanning layers is controlled to 67.5°, a laser input power is controlled to 300-350 W, a scanning speed is controlled to 750-850 mm/s, a scanning space is controlled to 0.11-0.13 mm, and a powder layer thickness is controlled to 30-40 μm.

3. The method according to claim 1, wherein
   in the SLM building process, a laser spot diameter is controlled to 0.12 mm; and
   in the SLM building process, a snake scanning strategy is used for laser scanning.

4. The method according to claim 1, wherein
   in the step 2, the required nickel-based superalloy powder is prepared by argon atomization or by plasma rotating electrode process (PREP).

5. The method according to claim 1, wherein
   in the step 2, the protective atmosphere is an argon atmosphere.

6. The method according to claim 1, wherein
   the required nickel-based superalloy powder comprises the following components in percentage by mass:
   Co: 20.6 wt %;
   Cr: 13.0 wt %;
   Mo: 3.8 wt %;
   W: 2.1 wt %;
   Al: 2.0 wt %;
   Ti: 2.5 wt %;
   Ta: 2.4 wt %;
   Nb: 0.9 wt %;
   Zr: 0 wt %;
   B: 0.01 wt %;
   C: 0.04 wt %; and
   Ni: the balance;
   the required nickel-based superalloy powder is prepared by argon atomization, and is sieved to obtain powder suitable for the SLM building; and
   the SLM building is used, a substrate heating temperature is adjusted to 150° C., a rotation angle between scanning layers is set to 67°, a laser input power is set to 325 W, a scanning speed is set to 800 mm/s, a scanning space is set to 0.12 mm, a powder layer thickness is set to 30 μm, a laser spot diameter is selected as 0.12 mm, a snake scanning strategy is selected for laser scanning, and after argon gas is introduced, printing is started, to obtain an as-built part with a density of 99.35%, no cracks, and a tensile strength of 1145 MPa at room temperature on an X-Y plane.

7. The method according to claim 1, wherein
   the required nickel-based superalloy powder comprises the following components in percentage by mass:
   Co: 8.5 wt %;
   Cr: 16 wt %;
   Mo: 1.75 wt %;
   W: 2.6 wt %;
   Al: 2.0 wt %;
   Ti: 2.5 wt %;
   Ta: 1.75 wt %;
   Nb: 0.9 wt %;
   Zr: 0 wt %;
   B: 0.01 wt %;
   C: 0.11 wt %; and
   Ni: the balance;
   the required nickel-based superalloy powder is prepared by argon atomization, and is sieved to obtain powder suitable for the SLM building; and
   the SLM building is used, a substrate heating temperature is adjusted to 150° C., a rotation angle between scanning layers is set to 67°, a laser input power is set to 300 W, a scanning speed is set to 750 mm/s, a scanning space is set to 0.12 mm, a powder layer thickness is set to 30 μm, a laser spot diameter is selected as 0.12 mm, a snake scanning strategy is selected for laser scanning, and after argon gas is introduced, printing is started, to obtain an as-built part with a density of 99.28%, no cracks, and a tensile strength of 1127 MPa at room temperature on an X-Y plane.

* * * * *